(12) United States Patent
Jahnke

(10) Patent No.: US 9,384,673 B1
(45) Date of Patent: Jul. 5, 2016

(54) EMERGENCY SIMULATION DEVICE

(71) Applicant: JAHNKE & SONS CONSTRUCTION, INC., Overland Park, KS (US)

(72) Inventor: Matthew L. Jahnke, Shawnee, KS (US)

(73) Assignee: JAHNKE & SONS CONSTRUCTION, INC., Overland Park, KS (US)

( * ) Notice: Subject to any disclaimer, the term of this patent is extended or adjusted under 35 U.S.C. 154(b) by 251 days.

(21) Appl. No.: 14/212,472

(22) Filed: Mar. 14, 2014

Related U.S. Application Data

(60) Provisional application No. 61/794,316, filed on Mar. 15, 2013.

(51) Int. Cl.
*G09B 9/00* (2006.01)
*A62C 99/00* (2010.01)

(52) U.S. Cl.
CPC .............. *G09B 9/00* (2013.01); *A62C 99/0081* (2013.01)

(58) Field of Classification Search
CPC .......... G09B 9/00; G09B 19/00; G09B 25/04; A62C 99/0081
USPC .................. 434/226; 52/302.1–302.7, 218
See application file for complete search history.

(56) References Cited

U.S. PATENT DOCUMENTS

| | | | |
|---|---|---|---|
| 6,685,574 B2 | 2/2004 | Hall | |
| 6,802,782 B2 | 10/2004 | Hall | |
| 6,953,401 B2* | 10/2005 | Starr | A63J 5/023 40/427 |
| 7,762,897 B2 | 7/2010 | Starr | |
| 2004/0191736 A1* | 9/2004 | Werhun | G09B 19/00 434/226 |
| 2009/0197229 A1* | 8/2009 | Blackburn | G09B 19/00 434/226 |

* cited by examiner

*Primary Examiner* — Sam Yao
*Assistant Examiner* — Kristen Dragon
(74) *Attorney, Agent, or Firm* — Lathrop & Gage LLP

(57) ABSTRACT

An emergency simulation device has a housing, at least one light, a smoke machine, and a controller for controlling the light and the smoke machine. The housing has a divider with a generally enclosed area underneath for holding the smoke machine. The divider has a hole and is angled so that water sitting on the divider flows in at least one direction. The housing extends upwardly beyond the divider, and apertures positioned in the housing dispel water from atop the divider. The housing has a duct extending upwardly from the hole in the divider. The light is mounted to a mounting plate separate from and positioned above from the divider and the duct and below a top end of the housing. The smoke machine outputs smoke through the hole in the divider and the duct. The mounting plate causes the smoke to billow outwardly around the light.

13 Claims, 4 Drawing Sheets

EMERGENCY SIMULATION DEVICE

RELATED APPLICATIONS

This application claims priority to provisional application 61/794,316 filed Mar. 15, 2013 and titled "Emergency Simulation Device", the disclosure of which is incorporated herein in its entirety by reference.

BACKGROUND

Embodiments of the current invention provide emergency simulation devices and methods of using emergency simulation devices, and specifically emergency simulation devices appropriate for use in live training exercises that may incorporate water.

Emergency responders (e.g., firefighters, police officers, etc.) are required to go through rigorous training before qualification in their respective fields. The training must be somewhat realistic in order to prepare the responders for the types of emergencies that will be encountered on the job. For firefighters, this often requires simulating fires with actual burning buildings. Though realistic, there is some inconvenience associated with having to burn an entire building, and simulating different kinds of fires (e.g., electrical, chemical, etc.) is increasingly difficult and/or dangerous. As it is often part of the firefighters' job to determine the source or cause of the fire to quickly and efficiently distinguish the fire and prevent further damage, knowing the difference between a wood burning fire and a chemical or electrical fire may be crucial.

SUMMARY

The following presents a simplified summary of an emergency simulation device in order to provide a basic understanding of some aspects of the invention. The summary is not an extensive overview of the invention. It is not intended to identify critical elements of the invention or to delineate the scope of the invention. Its sole purpose is to present some concepts of the invention in a simplified form as a prelude to the more detailed description that is presented below.

In one embodiment, an emergency simulation device has a housing, at least one light, a smoke machine, and a controller for controlling the light and the smoke machine. The housing has a divider with a generally enclosed area underneath the divider. The divider further has a hole and is angled so that water sitting on the divider flows in at least one direction. The housing extends upwardly beyond the divider, and has apertures positioned in the housing above the divider to dispel the water from atop the divider. The housing also has a duct extending upwardly from the hole in the divider. A mounting plate is positioned above, and is separated from the divider and the duct, and is below a top end of the housing. The light is mounted to the mounting plate. The smoke machine is housed in the generally enclosed area of the housing, and outputs smoke through the hole in the divider and the duct. The mounting plate causes the smoke to billow outwardly around the light.

In another embodiment, an emergency simulation device has a housing with a divider, at least one mounted light, a smoke machine, computer readable media, at least one processor in data communication with the computer readable media, the at least one mounted light, and the smoke machine, and electronic instructions that, when executed by the at least one processor, perform steps for actuating the at least one light and the smoke machine to simulate a fire utilizing at least one of: (a) input from a user, and (b) settings stored in the computer readable media. A generally enclosed area beneath the divider houses the smoke machine. The divider has a hole, and is angled such that water sitting on the top of the divider flows in at least one direction. The housing extends upwardly beyond the divider, and has at least one aperture to dispel water from atop the divider. The housing further has a duct extending upwardly from the hole and a mounting plate is positioned above and separated from the divider and the duct, and is below a top end of the housing. The at least one light is mounted to the mounting plate. Smoke from the smoke machine in the generally enclosed area outputs smoke through the hole and the duct, and the mounting plate causes the smoke to billow outwardly around the at least one light.

DETAILED DESCRIPTION

Figure 1:
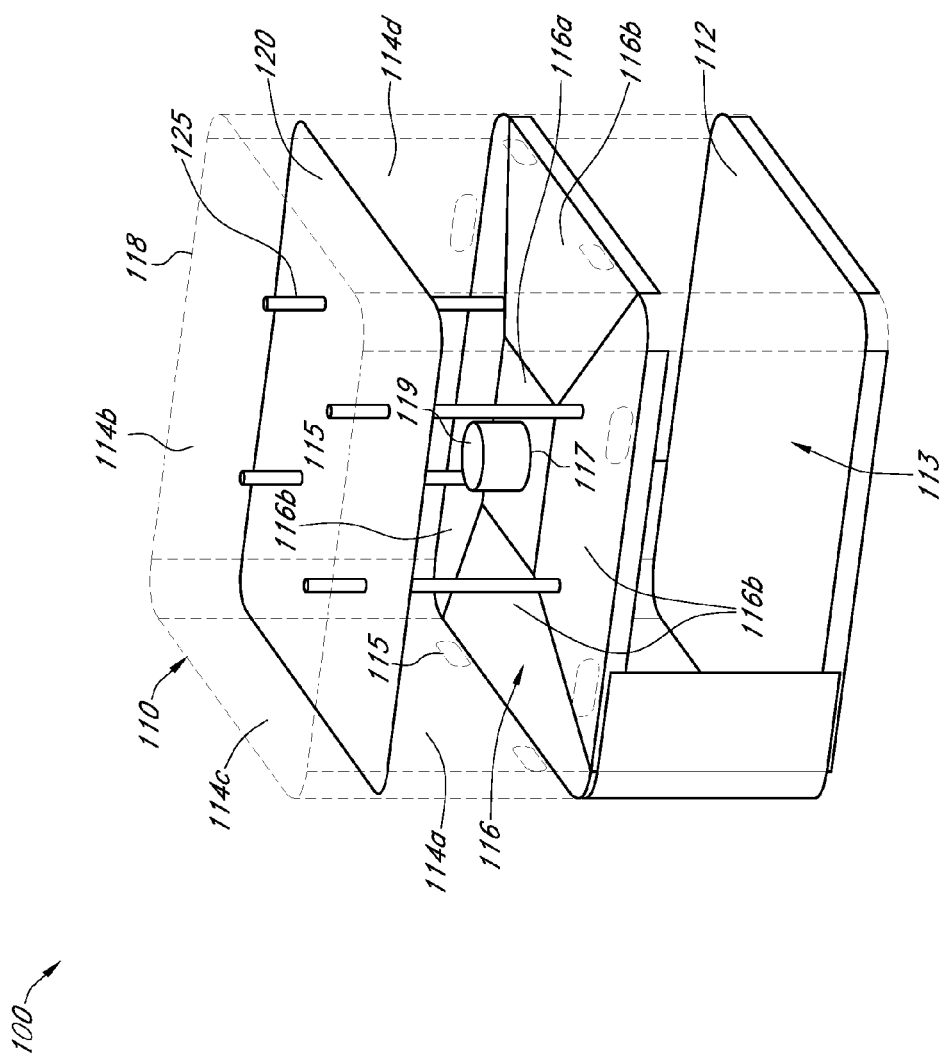
FIG. 1 is a perspective view of an emergency simulation device according to one embodiment of the invention, with various elements removed for clarity.

Embodiments of the present invention provide an emergency simulation device 100. With reference to FIG. 1, the emergency simulation device 100 may have a housing 110 which includes a floor 112, a front sidewall 114a, a rear sidewall 114b, lateral sidewalls 114c, 114d, and a divider 116. In some embodiments, each of the sidewalls 114 is generally the same size, though other embodiments may include different configurations such that the housing 110 takes a different shape (e.g., rectangular, cylindrical, et cetera). An enclosed area 113 is defined under the divider 116, and a door in a respective sidewall 114 (e.g., the rear sidewall 114b) may provide access to the enclosed area 113. The divider 116 includes a centrally disposed hole 117, and a center portion 116a of the divider 116 may be raised relative to outer portions 116b, which in turn may be angled toward apertures 115 in the sidewalls 114 (which extend upwardly beyond the divider 116). The apertures 115 are shown to have an oval shape, though other shapes may also be acceptable. Various materials may be used to construct the housing 110, such as steel, other metals, composites, et cetera.

A duct 119 (e.g., a hollow cylinder) may extend upwardly around the hole 117 any desired distance, such as an inch. The duct 119 may, for example, allow smoke from a smoke machine 150 in the enclosed area to enter an area atop the divider 116. The duct 110 may further prevent water from escaping through the hole 117 and into the enclosed area 113.

A mounting plate 120 may be positioned over the divider 116 and the duct 119, with separation between an end of the duct 119 and the mounting plate 120, yet under a top end 118 of the housing 110. The mounting plate 120 may preferably cover the center portion 116a, and may be coupled to the divider 116 or the sidewalls 114 in various ways. For example, threaded rods 125 may be used to position the mounting plate 120 over the divider 116.

Figure 4:
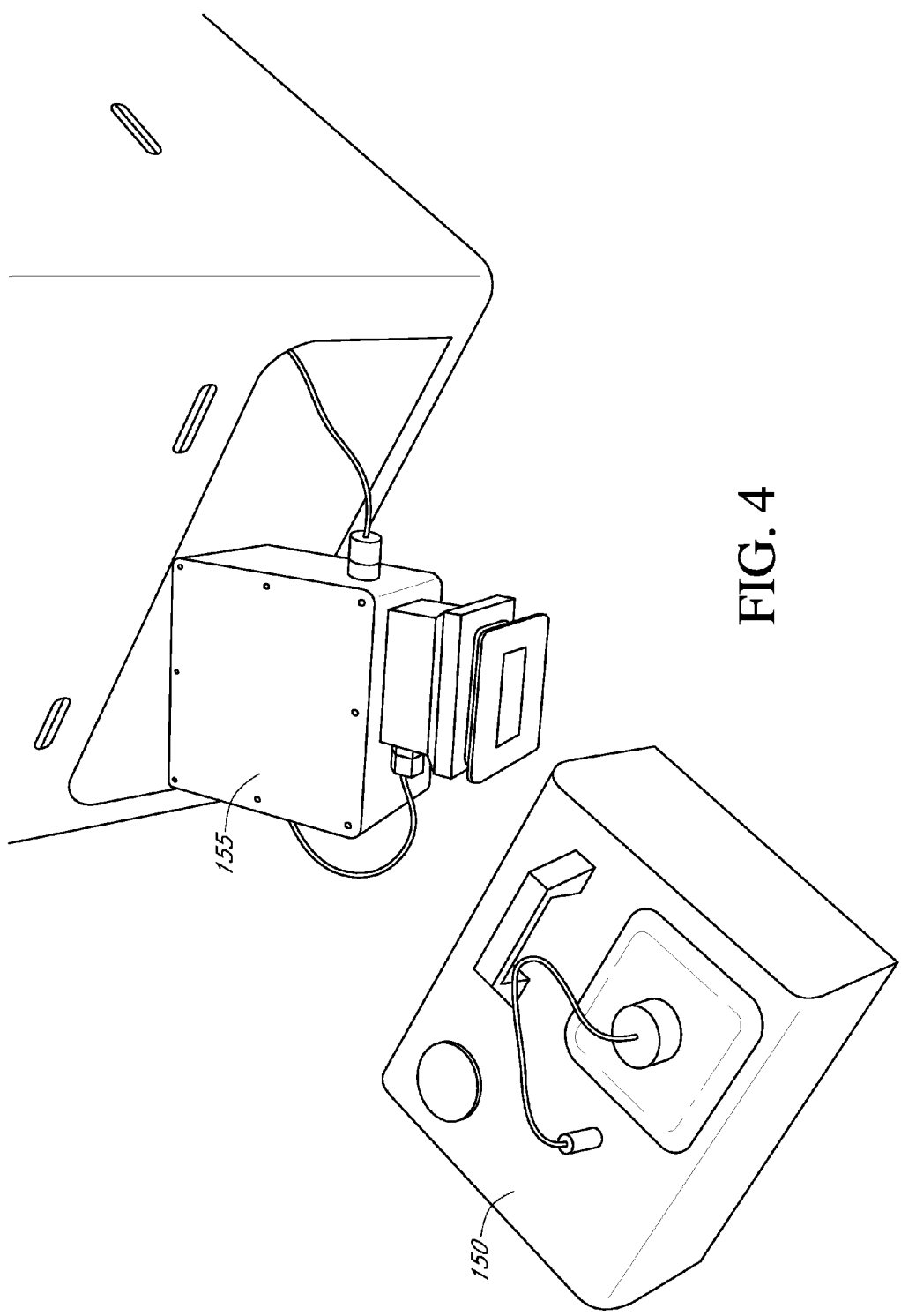
FIG. 4 is a perspective view of the emergency simulation device of FIG. 1, showing an enclosed area of the housing, a smoke machine, and a controller.

FIG. 4 shows a smoke machine 150 and a control panel 155, which may be located in the enclosed area 113, and stops may be positioned inside the enclosed area 113 to position the smoke machine 150 in a predetermined location to best expel smoke through the hole 117. The control panel 155 may, for example, utilize the DMX standard, and may include a processor in data communication with computer memory storing programming and data for use by the processor.

Figure 2:
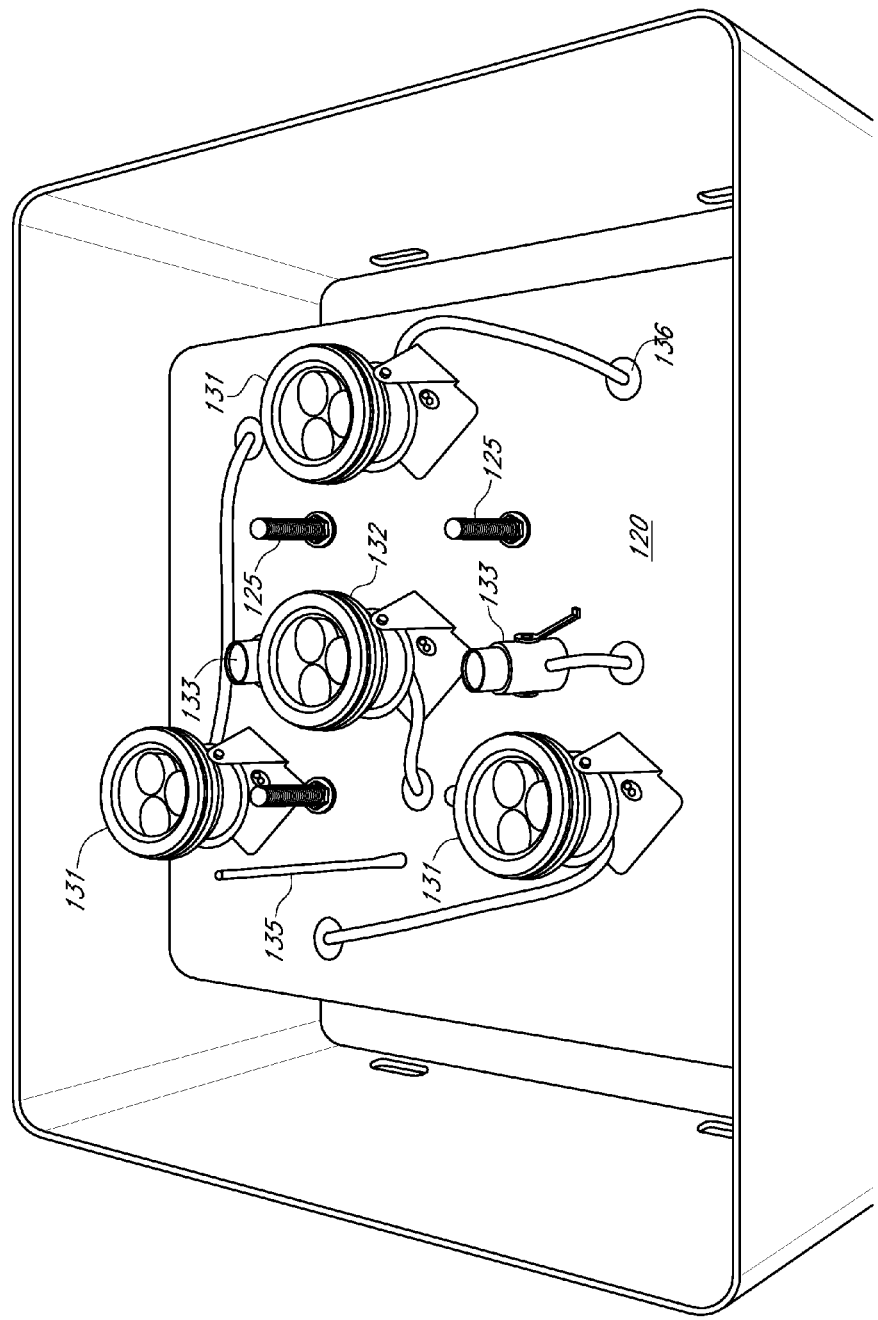
FIG. 2 is a top view of the emergency simulation device of FIG. 1, showing a mounting plate and various elements attached thereto.

Various devices may be located atop the mounting plate 120 and be in communication with the control panel 155. For example, in the embodiment shown in the FIG. 2, three white lights 131 surround a red light 132, and smaller blue lights 133 are included. The blue lights 133 may be actuated to simulate sparks for electrical fires, and the red and white lights 132, 131 may be used to simulate fires. The disclosed arrangement of white and red lights 131, 132 may be particularly useful for simulating fires, as fewer red lights 132 than white lights 131 may be desirable. But in various embodiments, other colored lights such as yellow may additionally (or alternately) be used. An antenna 135 is included for remote control of the various elements (e.g., through the control panel 155 and an input unit complementary to the remote control), and gaskets 136 may be used to prevent water from passing through holes in the plate 120 used for wiring to pass through.

Figure 3:
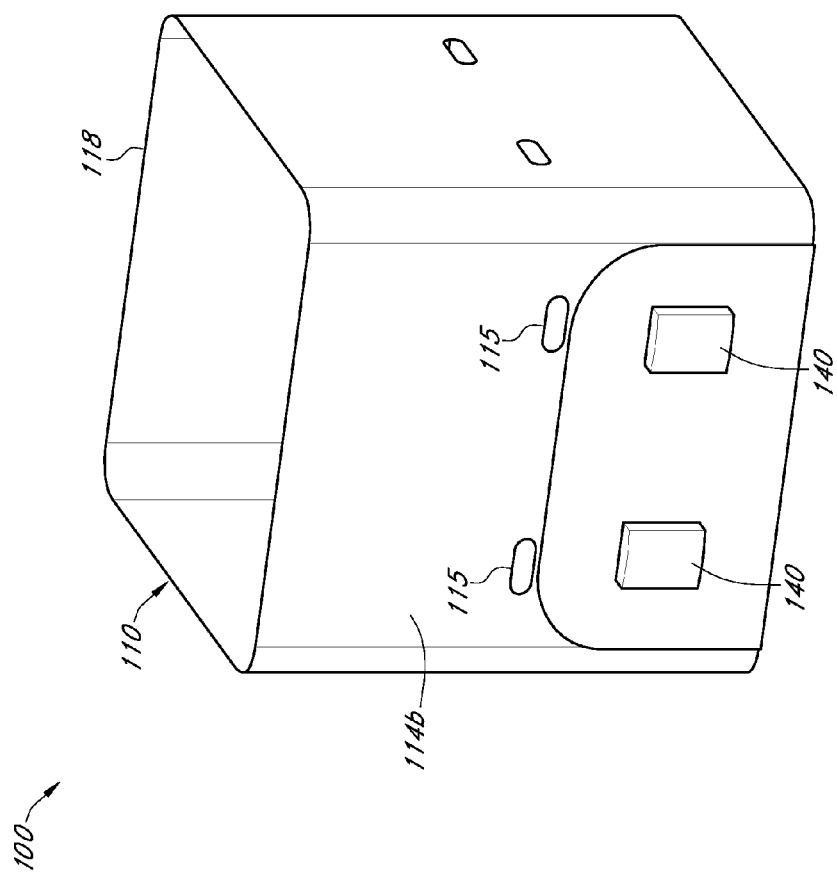
FIG. 3 is a side view of the emergency simulation device of FIG. 1, showing the speakers attached to a housing.

As is shown in FIG. 3, speakers 140 may be coupled to the housing 110 and in communication with the controller 155, and in some embodiments it may be desirable for the speakers 140 to be generally waterproof and coupled to the rear sidewall 114b. In FIG. 3, the speakers 140 are coupled to a removable plate that provides access to the enclosed area 113.

In use, the lights 131, 132, 133, the smoke machine 150, and the speakers 140 may be actuated (e.g., by the control panel 155) to simulate different types of fire situations, and water (e.g., from a fire hose or extinguisher) may be directed to the emergency simulation device 100 without causing damage to the emergency simulation device 100. The mounting plate 120 may both cause smoke from the smoke machine 150 (passing through the hole 117 and the duct 119) to billow in a desirable manner and also restrict water from entering the hole 117 and the enclosed area 113. The duct 119 may further restrict water from entering the hole 117 and the enclosed area 113, and the configuration of the divider 116 and the apertures 115 may allow water to exit the emergency simulation device 100 harmlessly.

Volume settings of the speakers 140 may increase and decrease as intensity of smoke from the smoke machine 150 is increased/decreased, and settings (e.g., order and timing of lights 131, 132, 133, timing and intensity of output from the smoke machine 150, output of the speakers 140, etc.) may be preset or manual.

In some embodiments, at least one sensor is coupled to the housing 110 (e.g., on an outside of a sidewall 114, on the divider 116, et cetera) for detecting water. And the control panel 155 may alter the simulation of the emergency based on data from the sensor. For example, a simulated fire intensity may be decreased as the sensor(s) detect water from a fire hose. And if a sufficient amount of water is not detected, the intensity may increase.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An emergency simulation device, comprising:
a housing having a divider with a generally enclosed area underneath, the divider having a hole therein and being angled such that water sitting thereon flows in at least one direction, the housing extending upwardly beyond the divider and having at least one aperture positioned to dispel water from atop the divider, the housing having a duct extending upwardly from the hole and a mounting plate positioned above and separated from the divider and the duct, the mounting plate being below a top end of the housing;
at least one light mounted to the mounting plate;
a smoke machine in the generally enclosed area for outputting smoke through the hole and the duct, the mounting plate causing the smoke to billow outwardly around the at least one light;
a controller in data communication with the at least one light and the smoke machine for actuating the at least one light and the smoke machine.

2. The emergency simulation device of claim 1, further comprising an antenna in data communication with the controller for allowing remote control of the controller.

3. The emergency simulation device of claim 1, further comprising at least one speaker mounted to a sidewall of the housing, the at least one speaker being in data communication with the controller.

4. The emergency simulation device of claim 3, further comprising at least one sensor coupled to the housing for detecting water, and wherein the control panel alters output of at least one of the following elements based on data from the sensor: the at least one light, the smoke machine, and the at least one speaker.

5. The emergency simulation device of claim 1, wherein:
a center portion of the divider is raised relative to outer portions of the divider; and
the hole is in the divider center portion.

6. The emergency simulation device of claim 5, wherein the mounting plate covers the center portion of the divider.

7. The emergency simulation device of claim 6, wherein a plurality of threaded rods couple the mounting plate to the divider.

8. The emergency simulation device of claim 7, further comprising an antenna in data communication with the controller for allowing remote control of the controller.

9. The emergency simulation device of claim 8, further comprising at least one speaker mounted to a sidewall of the housing, the at least one speaker being in data communication with the controller.

10. The emergency simulation device of claim 9, further comprising at least one sensor coupled to the housing for detecting water, and wherein the control panel alters output of at least one of the following elements based on data from the sensor: the at least one light, the smoke machine, and the at least one speaker.

11. The emergency simulation device of claim 1, further comprising at least one sensor coupled to the housing for detecting water, and wherein the control panel alters output of at least one of the following elements based on data from the sensor: (a) the at least one light, and (b) the smoke machine.

12. An emergency simulation device, comprising:
a housing having a divider with a generally enclosed area underneath, the divider having a hole therein and being angled such that water sitting thereon flows in at least one direction, the housing extending upwardly beyond the divider and having at least one aperture positioned to dispel water from atop the divider, the housing having a duct extending upwardly from the hole and a mounting plate positioned above and separated from the divider and the duct, the mounting plate being below a top end of the housing;
at least one light mounted to the mounting plate;
a smoke machine in the generally enclosed area for outputting smoke through the hole and the duct, the mounting plate causing the smoke to billow outwardly around the at least one light;
computer readable media;
at least one processor in data communication with the computer readable media, the at least one light, and the smoke machine; and
electronic instructions that, when executed by the at least one processor, perform steps for actuating the at least one light and the smoke machine to simulate a fire utilizing at least one of: (a) input from a user, and (b) settings stored in the computer readable media.

13. The emergency simulation device of claim 12, further comprising:
at least one speaker in data communication with the processor;
at least one sensor for detecting water in data communication with the processor;
electronic instructions that, when executed by the at least one processor, perform steps for actuating the at least one speaker; and
electronic instructions that, when executed by the at least one processor, perform steps for automatically altering output of at least one of the following elements based on data from the sensor: the at least one light, the smoke machine, and the at least one speaker.

* * * * *